(12) United States Patent
Nellen

(10) Patent No.: US 7,631,929 B2
(45) Date of Patent: Dec. 15, 2009

(54) OPEN ROOF CONSTRUCTION

(75) Inventor: Marcel Johan Christiaan Nellen, Venray (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 12/186,186

(22) Filed: Aug. 5, 2008

(65) Prior Publication Data

US 2009/0039683 A1 Feb. 12, 2009

(30) Foreign Application Priority Data

Aug. 9, 2007 (EP) .................................. 07114110

(51) Int. Cl.
*B60J 7/043* (2006.01)
(52) U.S. Cl. .................. 296/224; 296/216.02
(58) Field of Classification Search ................
296/216.02–216.05, 224
See application file for complete search history.

(56) References Cited

U.S. PATENT DOCUMENTS

| 5,303,974 | A | 4/1994 | Schlapp |
| 6,338,509 | B1 * | 1/2002 | Rice et al. ................... 292/223 |
| 6,390,544 | B1 * | 5/2002 | Manders et al. ............. 296/223 |
| 7,578,550 | B2 * | 8/2009 | Sawada et al. .............. 296/224 |
| 2006/0091704 | A1 | 5/2006 | Boutin et al. |

FOREIGN PATENT DOCUMENTS

| DE | 102005007032 | 8/2006 |
| EP | 0140491 | 5/1985 |
| EP | 0551839 | 7/1993 |
| EP | 1614569 | 1/2006 |
| WO | WO 2006086958 | 8/2006 |

OTHER PUBLICATIONS

Official Search Report of the European Patent Office in counterpart foreign application No. EP 0711410 filed Aug. 9, 2007.

* cited by examiner

*Primary Examiner*—Dennis H Pedder
(74) *Attorney, Agent, or Firm*—Steven M. Koehler; Westman, Champlin & Kelly, P.A.

(57) ABSTRACT

An open roof construction and roof assembly for a vehicle comprises a stationary roof part, a roof opening provided therein and a panel which is slideable for opening and closing said roof opening. The panel and stationary roof part are provided with a pin and curve part assembly for guiding and locking the panel in its closing position. The curve part is provided with an extension part projecting from the curve part for engaging the arriving pin and leading it into curve formed in the curve part, said extension part being movable between an extended position when the panel is in its opening position and a collapsed position when the panel is in its closing position.

18 Claims, 2 Drawing Sheets

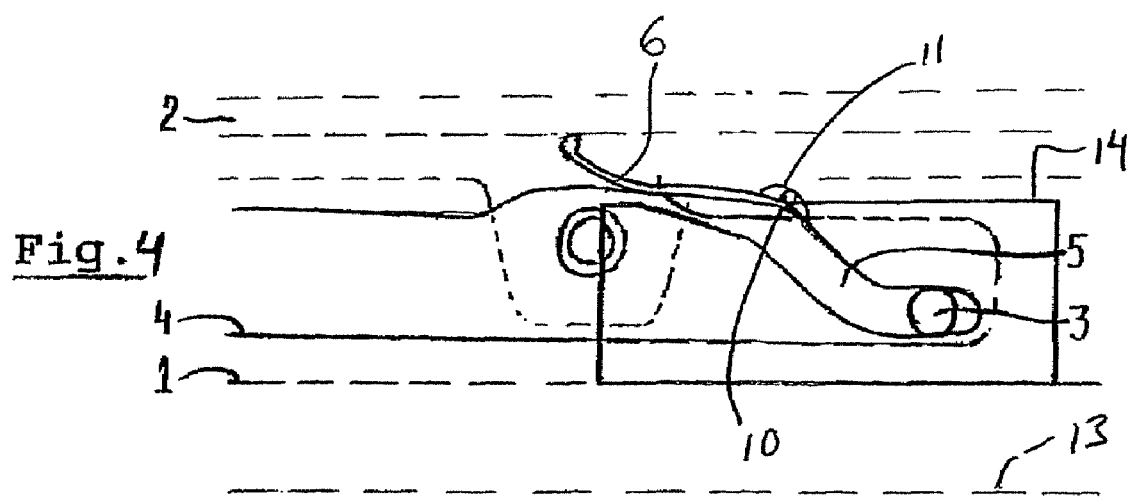

OPEN ROOF CONSTRUCTION

BACKGROUND

The discussion below is merely provided for general background information and is not intended to be used as an aid in determining the scope of the claimed subject matter.

Aspects of the invention relate to an open roof construction or a roof assembly for a vehicle, comprising a stationary roof part, a roof opening provided therein and a panel which is slideable for opening and closing said roof opening, and wherein the panel and stationary roof part are provided with a pin and curve assembly for guiding and locking the panel in its closing position.

Recently the panels used in open roof constructions of the type referred to above have increased in size quite substantially. This has resulted in a corresponding increase of wind loads and vibrational loads on the panel, and thus on the pin and curve assembly. For enabling a safe cooperation between the pin and curve, i.e. for safeguarding that under all circumstances the pin is reliably caught in the curve when the panel moves towards its closing position, the curve should have a sufficient height. However, due to constructional limitations (the so-called "package height" is limited) the height of the curve cannot be as large as desired. This means that there is a probability that the pin and curve will not get engaged correctly during closing the panel and that, as a consequence, the panel is not locked in its closing position.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

In accordance with an aspect of the present invention an open roof construction or roof assembly of the above type is provided in which a curve part is provided with an extension part projecting from the curve for engaging the arriving pin and leading it into a curve formed in the curve part, said extension part being movable between an extended position when the panel is in its opening position and a collapsed position when the panel is in its closed position.

When the panel moves from its opening towards its closing position, the extension part initially is in its extending position in which it offers the optimal engagement for the pin. Next the extension part guides the pin into the curve and finally the extension part is collapsed such that it does not hinder the panel in moving to a compact position in which the "package-height" of the open roof assembly is minimised.

When the panel moves from its closing position towards its opening position, the extension part will automatically return to its extended position.

The movement of the extension part may be realised by a free end thereof which will engage the panel when latter moves towards the closing position. However, this does not preclude the possibility that the movement of the extension part is caused by other devices or parts of roof assembly or the open roof construction.

In one embodiment the extension part is flexible, which flexibility allows its movement as desired. For example such a flexibility may be obtained if the extension part is constructed of spring steel.

In an alternative embodiment the extension part is substantially rigid and is hingedly connected to the curve part.

In one embodiment, the curve has two opposite sides of which a first side engages the pin during the movement of the panel towards the closing position and wherein said extension part defines a guiding surface merging into said first side. This results in a smooth transition of the pin from the extension part into the curve.

Finally, in one embodiment, the pin is attached to the panel whereas the curve part is attached to the stationary roof part. This minimises the weight of the (moving) panel. However, it also could be the other way around.

BRIEF DESCRIPTION OF THE DRAWINGS

Hereinafter the invention will be elucidated while referring to the drawing, in which

FIG. 4 shows a schematic cross-sectional view of an alternative embodiment.

DETAILED DESCRIPTION OF THE ILLUSTRATIVE EMBODIMENT

Figure 1:
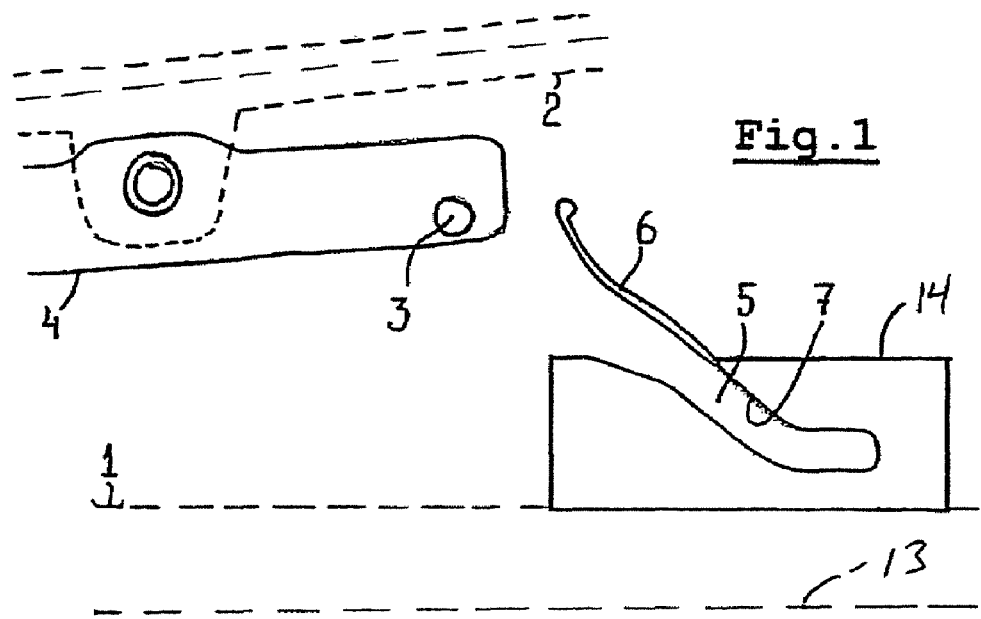
FIG. 1 shows a schematic cross-sectional view of an embodiment of the open roof construction with a panel in its opening position.

Referring firstly to FIG. 1 part of an open roof construction for a vehicle is shown schematically in a cross-sectional view and in an open position. (Forward movement of the vehicle is to the left in the figures.) Indicated by dotted lines is a constructional roof part 1 being connected (for example, being welded or by fasteners, but not otherwise shown in detail) to a stationary roof part (lower dashed line 13) of the vehicle (herein represented by lower dashed line 13). In a way known per se, but not illustrated, a roof opening is provided in the stationary roof part of the vehicle, and this roof opening can be opened and closed by a roof assembly having a panel 2 (only schematically indicated by an upper dashed line). The panel 2 can slide and tilt for opening and closing said roof opening by means of an operating mechanism not shown here but known per se by those of ordinary skill in the art.

Figure 3:
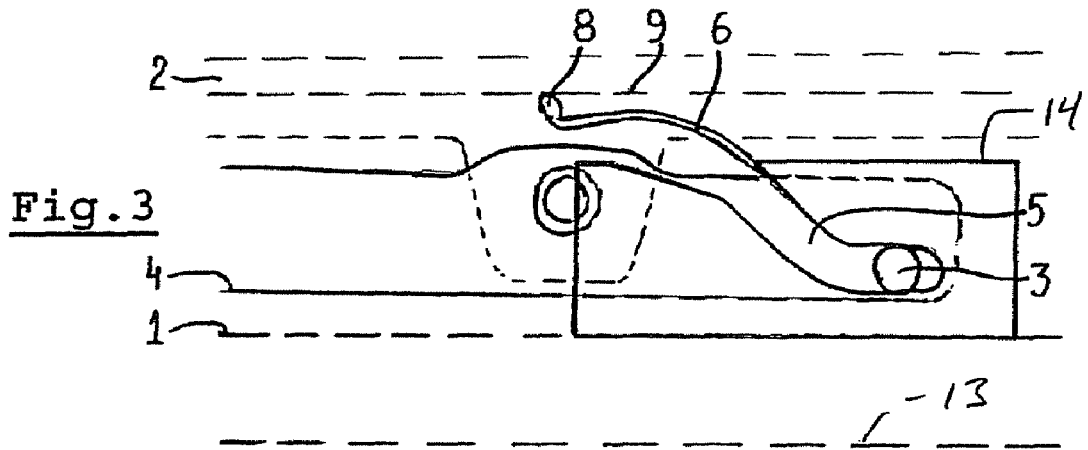

The panel 2 is provided with a guide pin 3 (which can be attached to the panel directly or indirectly, for example—as shown in FIG. 1—through a bracket 4). The constructional roof part 1 is provided with a curve part 14 having a curve 5 for guiding the guide pin 3. The assembly of guide pin 3 and curve 5 functions to guide the panel 2 towards a closed and locked position as illustrated in FIG. 3.

At this point it should be noted that the roof assembly can include one or more of the curve part 5 and guide pin 3 locking assemblies. For instance, one such locking assembly can be provided on a single side of the roof opening, or two such assemblies can be present, one on each side of the roof opening. Likewise, one such assembly can be located on or near a center or midline (i.e. transverse to forward motion of the vehicle) of the roof opening at a rear portion or rearward thereof.

It should be noted that aspects of the invention described here are also applicable to a situation in which the parts are reversed, in other words where the guide pin 3 is part of (or is connected to) the constructional roof part 1 and the curve part 14 is part of (or is connected to) the panel 2.

The curve part 14 is provided with an extension part 6 projecting from the curve 5 for engaging the arriving guide pin 3 when the panel is moving towards its closing position, and leading the guide pin 3 into the curve 5. In FIG. 1, corresponding to a situation in which the panel 2 is not in its closing position, the extension part 6 is in an extended position.

The curve 5 has two opposite sides of which a first side 7 engages the pin 3 during the movement of the panel 2 towards the closing position. The extension part 6 defines a guiding surface merging into said first side 7.

Figure 2:
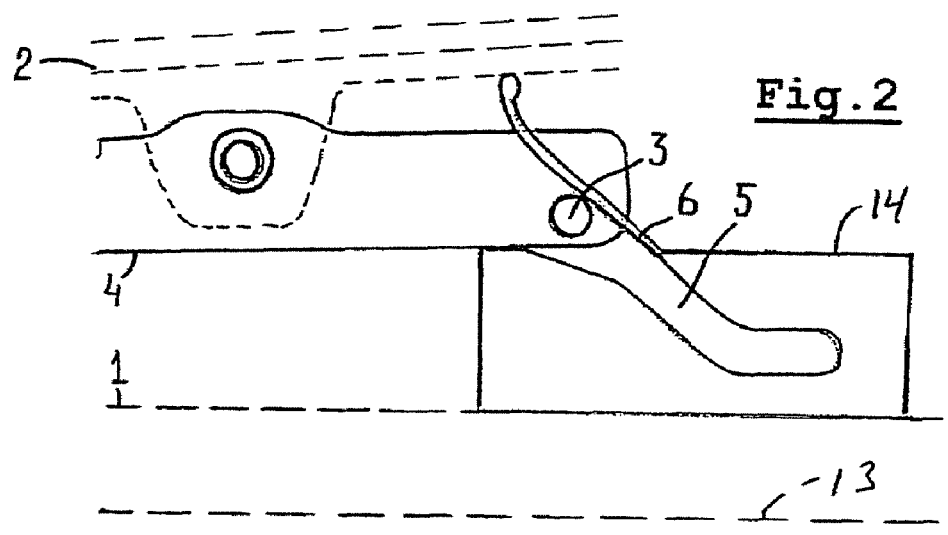
FIG. 2 shows a corresponding schematic cross-sectional view of said embodiment of the open roof construction with the panel in a position between its opening and closing positions, FIG. 3 again shows a schematic cross-sectional view of said embodiment of the open roof construction with the panel in its closing position.

In FIG. 2 a transitional situation is illustrated between a fully opened and a fully closed position of the panel 2. Its guide pin 3 already has engaged the extension part 6 and has moved downwards along it towards the curve 5. The panel 2, of course, has experienced a corresponding downward movement.

When the panel 3 has reached its closing position, illustrated in FIG. 3, the guide pin 3 has reached its innermost position in or the remote end of the curve 5. The extension part 6 has moved to a collapsed position as a result of a free end 8 thereof engaging a respective part 9 of the panel 2 (or element connected thereto) when the latter moves towards the closing position.

In the embodiment illustrated in FIG. 3 the extension part 6 is flexible and spring-like in that the extension 6 will return it its extended state (FIG. 1) when not forced down by the panel 2 or elements connected to it. For example, the extension 6 can be constructed of a resilient material such as but not limited to spring steel. It is possible however, that the extension part 6 is substantially rigid and is hingedly connected to the curve part 14 proximate curve 5 so as to effectuate the same guiding movement for the guide pin 3 as described above. FIG. 4 illustrates an exemplary form of this type of embodiment where a hinge connection 10 is provided between extension 6 and curve part 14, and in this embodiment, a spring 11 returns extension 6 to the position of FIG. 1 when the panel 2 or elements connected to it are not contacting the free end of extension 6. For example in such a manner that, starting from a situation according to FIG. 1 or 2 a hinging movement towards a position according to FIG. 4 is possible, but that a movement of the extension part 6 in the opposite direction when engaged by the guide pin 3 (in a situation according to FIG. 2) is prevented. In other words, upward (clockwise) pivoting motion of the extension part 6 is limited to the position shown in FIG. 2.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. An open roof construction for a vehicle, comprising a stationary roof part, a roof opening provided therein and a panel which is slideable for opening and closing said roof opening, and wherein the panel and stationary roof part are provided with a pin and curve part locking assembly configured to guide and lock the panel in its closing position, wherein the curve part is provided with an extension part projecting from the curve part for engaging the arriving pin and guiding the pin into a curve provided in the curve part, said extension part being movable with respect to the curve part between an extended position when the panel is in its opening position and a collapsed position when the panel is in its closing position.

2. The open roof construction according to claim 1, wherein the extension part has a free end which will engage a portion of the panel or an element connected thereto when the panel moves towards the closing position.

3. The open roof construction according to claim 2, wherein the extension part is flexible.

4. The open roof construction according to claim 3, wherein the extension part is configured to return to an extended position when not in contact with the panel.

5. The open roof construction according to claim 1, wherein the extension part is constructed of a spring-like material.

6. The open roof construction according to claim 5, wherein the extension part is constructed of spring steel.

7. The open roof construction according to claim 1, wherein the extension part is substantially rigid and is hingedly connected to the curve part.

8. The open roof construction according to claim 1, wherein the curve formed in the curve part has two opposite sides of which a first side engages the pin during the movement of the panel towards the closing position and wherein said extension part defines a guiding surface merging into said first side.

9. The open roof construction according to claim 1, wherein the pin is connected to move with the panel and the curve part is attached to the stationary roof part.

10. A roof assembly for a vehicle, comprising a panel configured for opening and closing a roof opening in a vehicle, and construction roof part configured to be secured to a stationary roof part of a vehicle, wherein the panel and construction roof part are provided with a pin and curve part locking assembly configured to guide and lock the panel in its closing position, wherein the curve part is provided with an extension part projecting from the curve part for engaging the arriving pin and guiding the pin into a curve provided in the curve part, said extension part being movable with respect to the curve part between an extended position when the panel is in its opening position and a collapsed position when the panel is in its closing position.

11. The roof assembly according to claim 10, wherein the extension part has a free end which will engage a portion of the panel or an element connected thereto when the panel moves towards the closing position.

12. The roof assembly according to claim 11, wherein the extension part is flexible.

13. The roof assembly according to claim 12, wherein the extension part is configured to return to an extended position when not in contact with the panel.

14. The roof assembly according to claim 10, wherein the extension part is constructed of a spring-like material.

15. The roof assembly according to claim 14, wherein the extension part is constructed of spring steel.

16. The roof assembly according to claim 10, wherein the extension part is substantially rigid and is hingedly connected to the curve part.

17. The roof assembly according to claim 10, wherein the curve formed in the curve part has two opposite sides of which a first side engages the pin during the movement of the panel towards the closing position and wherein said extension part defines a guiding surface merging into said first side.

18. The roof assembly according to claim 10, wherein the pin is connected to move with the panel and the curve part is attached to the construction roof part.

* * * * *